United States Patent [19]

Hoffman et al.

[11] Patent Number: 5,079,292

[45] Date of Patent: Jan. 7, 1992

[54] CURABLE SILICONE COMPOSITIONS AND NON-FLAMMABLE CURED PRODUCTS OBTAINED THEREFROM

[75] Inventors: Kenneth A. Hoffman, Deerfield; Jeffrey E. Julis, Buffalo Grove; Thomas J. Rissmann, Hoffman Estates, all of Ill.

[73] Assignee: Liquid System Technologies, Inc., Park Ridge, Ill.

[21] Appl. No.: 238,866

[22] Filed: Aug. 31, 1988

[51] Int. Cl.$^5$ .............................................. C08L 83/04
[52] U.S. Cl. .................................... 524/862; 524/786; 524/268
[58] Field of Search ................. 524/867, 789, 268

[56] References Cited

U.S. PATENT DOCUMENTS 4,822,659  4/1989  Anderson et al. ............... 428/99

Primary Examiner—Joseph L. Schofer
Assistant Examiner—Jeffrey T. Smith
Attorney, Agent, or Firm—Dressler, Goldsmith, Shore, Sutker & Milnamow, Ltd.

[57] ABSTRACT

A curable composition, suitable for use as a nonburnable adhesive is provided comprising a mixture of polysiloxane polymers comprising a straight chain component and a branched chain component, a platinum catalyst, a liquid organohydrogen polysiloxane cross-linking agent, a low viscosity dimethylvinyl chain-stopped dimethyl polysiloxane and alumina trihydrate.

13 Claims, 1 Drawing Sheet

CURABLE SILICONE COMPOSITIONS AND NON-FLAMMABLE CURED PRODUCTS OBTAINED THEREFROM

BACKGROUND OF THE INVENTION

The conquest of fire by primitive man was one of the most important milestones of pre-history and can truly be said to be the first step toward civilization. The great benefits of this early achievement have been obtained at the cost of the occasional destruction of life and property by accidental fires.

In certain aspects of modern civilization, there is extreme vulnerability to accidental fires because of an inability of those nearby to flee the scene. For example, a fire in an airplane, or in a submarine, can kill all passengers and crew unless it is first contained and then extinguished.

Recently, fire-block materials have been developed which are effective, even in thin layers, for blocking flame spread to a greater extent than the materials previously known.

One such material is described and claimed in co-assigned U.S. patent application Ser. No. 103,064, filed by Anderson et al. on Nov. 25, 1987, of which application the present application is a continuation-in-part. This material is a laminate of a silicone foam and a support layer. It has a flame spread index of zero at 20 minutes of exposure in accordance with ASTM E-162 and is capable, in a thickness of 1/16 inch, of blocking a flame of 1900° F. for more than one hour.

The support layer of the aforesaid laminate is preferably a fiberglass woven cloth. The silicone foam contains alumina trihydrate as a filler and is the cured elastomeric reaction product of a vinyl-terminated polysiloxane containing —Si(CH$_3$)$_2$O— units and an organohydrogen siloxane containing —Si(H)(CH$_3$)O-units.

When it is desired to utilize the aforementioned laminate, or other silicone-based fire-block material, to cover an inflammable, or other heat-destructible object or layer, it is necessary to glue the laminate to the surface of the heat destructible layer, particularly to a vertical surface thereof or to the underside of a horizontal surface. Underside horizontal surfaces are particularly vulnerable to flames because hot air rising from a flame imparts directly on such underside horizontal surfaces and generally remains in contact long enough to inflame or damage susceptible materials.

For optimum flame retardency, it is necessary that the glue, or adhesive, holding the fire-block layer to its substrate be, itself, a fire-block material. Otherwise, the fire will spread through the turning of the adhesive.

A room or compartment, for example, may be lined on all of its interior walls with the fire-block laminate of said application Ser. No. 103,064. Nevertheless, fire will spread from such a room or compartment by ignition of the adhesive, particularly at exposed surfaces, if the adhesive is not, itself, non-burning.

Prior to this invention, adhesive materials have been sold which have been represented to be fire-retardant. These materials are capable of delaying the spread of a fire, but they are ignitable when flame contact is maintained and therefore do not provide prolonged fire-block protection. In addition, the fire retardant adhesive materials heretofore available have generally been of high viscosity because of high loading of solid fire retardant fillers. Such highly viscous materials are difficult to spread and are not suitable for spray application.

SUMMARY OF THE INVENTION

In accordance with one aspect of this invention there is provided a curable composition, suitable for use as a non-flammable adhesive comprising a) a mixture of polysiloxane polymers comprising a straight chain component and a branched chain component, each having vinyl unsaturation, b) a platinum catalyst, c) a liquid organohydrogen polysiloxane cross-linking agent, d) at least one low viscosity dixethylvinyl chain-stopped dimethyl polysiloxane having a viscosity below about 2000 centistokes at 25° C. in an amount from about 10 to about 200 parts per 100 parts of said straight chain component, and e) alumina trihydrate, in an amount from about 20 to about 300 parts per 100 parts of said straight chain component.

Preferably, the straight chain component comprises a dimethylvinyl chain-stopped polysiloxane having a viscosity from about 50,000 to about 750,000 centistokes at 25° C. and the branched chain component comprises trimethylsiloxane units, SiO$_2$ units and methylvinylsiloxane units, from about 2.5 to about 10 mole percent of the silicone units containing silicon-bonded vinyl groups and the ratio of trimethyl siloxane units to SiO$_2$ units being between about 0.5:1 and 1:1, and the mixture having an average molecular weight between about 50,000 and 150,000, having from about one to about five mole percent of vinyl groups and containing from about 20 to about 50 parts of said branched chain component per 100 parts of said straight chain component.

Also preferably, the amount of said liquid organohydrogen polysiloxane cross-linking agent is from about 20 to about 60 parts per 100 parts of said straight chain component.

If desired, a finely divided inorganic filler in addition to hydrated alumina may be present. Suitable fillers include silicon dioxide, titanium dioxide, antimony oxide, calcium silicate, calcium oxide, calcium hydroxide, ferric oxide, chromic oxide, cadmium sulfide, glass fibers, calcium carbonate, magnesium oxide, magnesium hydroxide alumina, carbon black lithopone and talc and mixtures thereof in an amount from zero to about 200 parts per 100 parts of said straight chain component.

In accordance With another preferred aspect of this invention, the aforesaid curable composition is a composition of low viscosity, between about 5,000 and 100,000 centistokes at 25° C. when freshly mixed and provides an adhesive between a fire-block layer and a substrate layer.

In accordance with still another aspect of this invention, the aforesaid composition provides the adhesive for a fire-block wrapper layer for electrically conductive cables.

In still another aspect of this invention, the aforesaid composition is cured in bulk within a mold to provide a non-burning elastomeric shaped object, such as a non-burning gasket.

BRIEF DESCRIPTION OF THE DRAWINGS

The embodiment of the invention relating to the utilization of the curable composition as an adhesive for a fire-block wrapper layer for electrically conductive cables is illustrated in the drawings, of which.

DETAILED DESCRIPTION OF THE INVENTION

Figure 1:
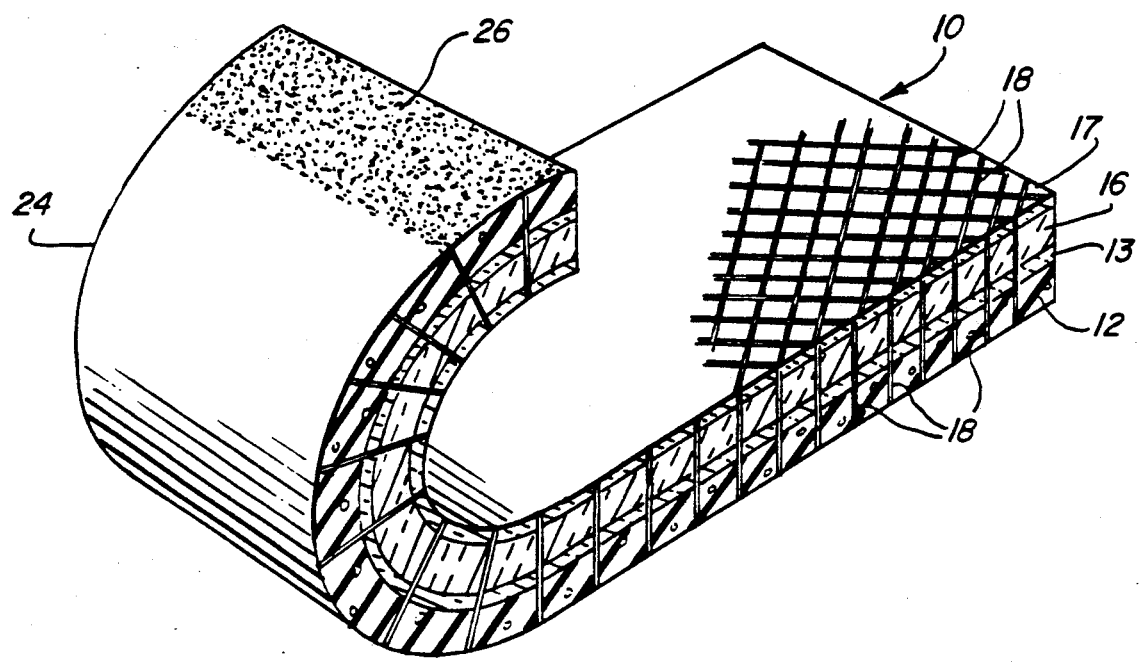
FIG. 1 is a perspective of the fire-block sheet wrapper, showing the location of the adhesive application.

The curable composition of this invention is a modification of the curable composition of U.S. Pat. No. 3,436,366, issued to Frank J. Modic on Apr. 1, 1969.

The aforementioned U.S. Pat. No. 3,436,366 discloses silicone potting compositions which include the aforementioned mixture of polysiloxane polymers including a straight chain component and a branched chain component. It also discloses a platinum catalyst, a liquid organohydrogen polysiloxane cross-linking agent and finely divided inorganic filler selected from the aforementioned group.

The present-composition differs from the composition of said U.S. Pat. No. 3,436,366 in the presence therein of at least one low viscosity dimethylvinyl chain-stopped dimethylpolysiloxane having a viscosity below about 2000 centistokes at 25° C. and in the presence therein of alumina trihydrate.

The curable composition of this invention is unstable in storage and must be freshly mixed for each use. It need not, however, be freshly mixed from its individual starting components and may be mixed from the final combination of two premixed storage-stable portions, designated as the "A" and "B" portions, as is known in the art in connection with other curable silicone polymers. Typically, the "A" portion contains curable silicone polymers, filler and catalyst and the "B" portion contains cross-linking agent. It is important that the catalyst and the cross-linking agent be maintained in separate premix portions.

The straight chain component of the polysiloxane polymer mixture is well-known in the art and is a component of many curable polysiloxane systems. In a preferred embodiment, the straight chain component has a viscosity from about 50,000 to about 750,000 centistokes at 25° C.

The branched chain component of the polysiloxane polymer mixture is also well known. In a preferred embodiment, it contains about 0.8 trimethylsiloxane units per $SiO_2$ unit. This component is normally solid, by itself, and is preferably added to the composition in a solution in xylene or toluene at about a 50 weight percent concentration.

The inorganic filler material is optional, and when present, does not function to reinforce the cured composition, although it tends to increase the hardness of the cured product. A preferred inorganic filler material is silicon dioxide in a narrow range of particle sizes, such as the silicon dioxide products sold under the trademark Min-U-Sil in sizes ranging from 1.5 to 50.0 microns.

The platinum catalyst employed in this invention includes all of the well known platinum catalysts which are effective for catalyzing the reaction between silicon-bonded hydrogen groups and silicon-bonded vinyl groups. These materials include the various finely divided elemental platinum catalysts, such as those shown in U.S. Pat. No. 2,970,150-Bailey, the chloroplatinic acid catalyst described in U.S. Pat. No. 2,823,218-Speier, the platinum hydrocarbon complexes shown in U.S. Pat. Nos. 3,159,601-Ashby, and 3,159,662-Ashby, as well as the platinum alcoholate catalysts which are described in U.S. Pat. No. 3,220,972-Lamorearx. Regardless of the type of platinum catalyst employed, the catalyst is used in an amount sufficient to provide from about $10^{-3}$ to $10^{-6}$ gram atoms of platinum per mole of silicon-bonded vinyl groups in the composition.

The organohydrogenpolysiloxane component is generally a composition of relatively simple molecular structure and is sometimes a mixture of such materials. One characteristic of the organohydrogenpolysiloxane is that it has two silicon-bonded hydrogen atoms per molecule. One of the silicon-bonded hydrogen atoms of the molecule reacts with a silicon-bonded vinyl group of either the straight chain component or the branched chain component of the polysiloxane polymer mixture and the second silicon-bonded hydrogen atom reacts with another of such silicon-bonded vinyl groups.

One illustration of a specific organohydrogenpolysiloxane compound which can be employed in the practice of the present invention is 1,3,5,7-tetramethyl-cyclotetrasiloxane, which contains one silicon-bonded methyl group and one silicon-bonded hydrogen atom per silicon atom. Another illustrative material is a dimethylhydrogen chain-stopped dimethylpolysiloxane containing from 2 to 3 silicon atoms in the molecule. A further type of composition is one which comprises a copolymer of dimethylsiloxane units, methylhydrogensiloxane units, and trimethylsiloxane units and which contains from 2 to 5 or 10 or more silicon atoms per molecule. A still further useful type of compound is the compound containing three dimethylhydrogensiloxane units and one monomethylsiloxane unit per molecule. Another useful material is the low viscosity fluid composed of dimethylhydrogensiloxane units and $SiO_2$ units in the ratio of 2 moles of the former to one mole of the latter.

The low viscosity dimethylvinyl chain-stopped dimethylpolysiloxane are materials sold in commerce for the compounding of silicone elastomers. One such material, sold under the trademark MASIL SF 201, is a liquid having a viscosity of about 1000 centistokes, a specific gravity of 0.965 and a refractive index of 1.4040, all at 25° C. It also has an iodine value of 2.85 and a flashpoint higher than 300° F. in accordance with ASTM D 93. Another such material, sold under the trademark MASIL SF 202, is a liquid having a viscosity of about 200 centistokes, a specific gravity of 0.960 and a refractive index of 1.4035, all at 25° C. It also has an iodine value of 5.75 and a flash point higher than 300° F.

These low viscosity dimethylvinyl chain-stopped dimethyl polysiloxanes may be used singly or in combination. In either case, their combined weight ranges from about 10 to about 200 parts per 100 parts of said straight chain component, and preferably from about 30 to about 50 parts per 100 parts of said straight chain component.

The low viscosity dimethylvinyl chain-stopped dimethyl polysiloxane component of this invention is essential to this invention because it lowers the viscosity of the composition and permits the compositions to be spread easily in a thin layer and even to be sprayed.

Alumina trihydrate is known to be a flame retardant filler material, but not to be exceptionally effective. As described in Modern Plastics Encyclopedia 1988 (p. 148), alumina trihydrate "requires high loadings to achieve modest flame retardance, but because the material is inexpensive, it is the largest single flame retardant used in the U.S." In the face of this general evaluation, it is surprising that an alumina trihydrate filler in the compositions of this invention provides non-burnability when other known fire retardant additives, which were tried, failed to achieve this result. Among the fire retardant additives which failed to provide the desired result are magnesium hydroxide, magnesium oxide, and zinc borate.

The alumina trihydrate generally contains about 65 weight percent of $Al_2O_3$ and about 35 weight percent of bound water which is lost through dehydration upon heating. Good results have been obtained with alumina trihydrate materials which have the following properties:

| | |
|---|---|
| $Al_2O_3$, % | 64.4–65.4 |
| $SiO_2$, % | less than 0.02 |
| $Fe_2O_3$, % | 0.004–0.007 |
| $Na_2O$ total % | 0.015–0.30 |
| $Na_2O$ soluble, % | 0.004–0.12 |
| Free moisture, 110° C., % | 0.05–0.12 |
| Loose bulk density, gm/cu cm | 0.35–1.2 |
| Packed bulk density, gm/cu cm | 0.5–1.5 |
| Surface area, sq m/gm | 0.10–14 |
| Color reflectance | 75 to 96 | wherein the surface area is measured by Perkins-Elmer Shell Sorptometer, and wherein the light reflectance is measured with a photo-volt reflectometer Model 670.

The curable compositions of this invention may be used to adhere many kinds of materials together, including materials with non-porous surfaces, foamed or porous materials and fibrous materials, and including metallic materials, ceramic materials and organic materials. In a preferred embodiment, at least one of the materials bonded by the cured composition of this invention is the fire-block sheet material of the aforesaid U.S. patent application Ser. No. 103,064 which has a surface flammability flame spread index of zero at 20 minutes of exposure in accordance with ASTM E-162 and which is capable, in a thickness of 1/16 inch, of blocking a flame of 1900° F. for more than one hour.

This fire-block sheet is a flexible laminate of a support layer, preferably a fiberglass woven fabric, attached to an elastomeric cured silicone foam rubber containing alumina trihydrate. The foam layer is the reaction product of a vinyl-terminated polysiloxane containing —Si(CH$_3$)$_2$O— units and an organohydrogen siloxane polymer containing —Si(H)(CH$_3$O— units, preferably containing from about 10 to about 16 parts of organohydrogen polysiloxane per 100 parts of vinyl-terminated polysiloxane. It also contains from about 50 to about 125 parts of alumina trihydrate per 100 parts of vinyl-terminated polysiloxane.

The silicone rubber foam is an alumina trihydrate filled modification of the foam sold commercially by General Electric Company as RTF 762 Silicone Rubber Foam, which is described in Modic U.S. Pat. No. 4,418,157, granted Nov. 29, 1983, with further details described in Modic U.S. Pat. No. 4,189,545, granted Feb. 19, 1980.

When it is desired to protect a substrate material from the effects of an accidental fire, the substrate may be covered with the fire-block sheet material of U.S. patent application, using the curable composition of tis invention as the adhesive between them.

The curable composition may be applied to either the substrate surface or a surface of the fire-block sheet material (usually the fiberglass support layer) or to both. The application must be made when the curable composition is freshly made and may be made by brush or roller, or by spraying. Typically, the curable composition is applied as a layer in a thickness from about 0.25 to about 1.25 millimeters.

The curable composition, in place between the substrate and the fire-block sheet material, is fully cured at room temperature after 5 hours. In some environments, it may be possible to apply an elevated temperature from about 100° C. to about 200° C. to the curable composition to accelerate the cure.

COMPARATIVE EXAMPLES 1-8 AND EXAMPLES 1-3

A series of compositions were prepared containing the following components in parts by weight shown in Table A:

TABLE A

| | Comparative Examples | | | | | | | | Examples | | |
|---|---|---|---|---|---|---|---|---|---|---|---|
| Ingredient | 1 | 2 | 3 | 4 | 5 | 6 | 7 | 8 | 1 | 2 | 3 |
| RTF762-A[1] | 100 | 100 | 100 | 100 | | | | | | | |
| Magnesium Oxide | 5 | | 5 | | | | | | | | |
| Calcium Oxide | | 5 | | 5 | | | | | | | |
| RTF762-B[2] | 6 | 6 | 5 | 5 | | | | | | | |
| SF202 | | | 10 | 10 | | 50 | 50 | 50 | 10 | 30 | 30 |
| Alumina Trihydrate | | | 40 | 40 | 25 | | | | 40 | 80 | 80 |
| RTV668A[3] | | | | | 100 | 100 | 100 | 100 | 100 | 100 | 100 |
| RTV668B[4] | | | | | 5 | 10 | 10 | 10 | 20 | 20 | 10 |
| SF201 | | | | | | | | | 15 | | |
| Mg(OH)$_2$ | | | | | | 50 | | | | | |
| MgO | | | | | | | 50 | | | | |
| Zinc Borate | | | | | | | | 50 | | | |

[1] "A" portion of silicone foam system in accordance with Modic U.S. Pat. Nos. 4,418,157 and 4,189,545
[2] "B" portion of silicone foam system in accordance with Modic U.S. Pat. Nos. 4,418,157 and 4,189,545
[3] "A" portion of silicone potting composition system in accordance with Modic U.S. Pat. No. 3,436,366
[4] "B" portion of silicone potting composition system in accordance with Modic U.S. Pat. No. 3,436,366.

The compositions were subjected to tests for adhesion and cure and to a flame test.

In the adhesion tests, a small amount (10–50 g) of the composition was placed between a substrate (usually a polyimide foam) and the glass fiber side of the fire-block sheet material described above and the composition was allowed to cure at room temperature for a period of about 5 hours after the substrate and the fire-block sheet were placed together. After curing, the fire-block sheet and the substrate were then pulled apart and observed at the bond failure. If the bond failure occurred within the adhesive layer, it was classified as a failure. If the failure was either in the fire-block sheet or in the substrate, it was classified as passing the adhesive test.

The cure test was an inspection of the composition to see if it solidified on standing, or whether it remained liquid or tacky.

The flame test was performed by placing samples of the cured composition into the hottest portion of a bunsen burner flame (temperature about 1500° F.) for about 20 seconds and determining and recording the times of after flame and glow after removal of the material from the flame. No after flame and an after glow of three seconds or less was considered to be a pass of the flame test.

Viscosity was also determined for the compositions which passed the other tests.

The results are shown in Table B:

doubled; and the time for such doubling was taken to be the "pot life." Standard ASTM test pieces were stamped out of the sheets and the pieces were subjected to testing on a standard tensile tester for tensile strength (psi) and percent elongation to break. The samples were also tested for hardness using a Durometer measuring the Shore "00" scale. All of the samples passed the flame tests. The results were as follows:

|  | EXAMPLES | | | | | | | | | |
| --- | --- | --- | --- | --- | --- | --- | --- | --- | --- | --- |
|  | 4 | 5 | 6 | 7 | 8 | 9 | 10 | 11 | 12 | 13 |
| RTV668-A | 100 | 100 | 100 | 100 | 100 | 100 | 100 | 100 | 100 | 100 |
| Alumina Trihydrate | 80 | 80 | 80 | 80 | 80 | 80 | 150 | 150 | 150 | 80 |
| SF202 | 30 | 30 | 30 | 30 | 30 | 50 | 50 | 50 | | |
| SF201 | | | | | | | | 50 | 50 | 50 |
| RTV668-B | 5 | 10 | 15 | 20 | 30 | 10 | 30 | 30 | 30 | 10 |
| Initial Visc (CPS × 1000) | 80.5 | 63.1 | 57.4 | 53.9 | 48.4 | 31.2 | 55.5 | 19.5 | 63.9 | 42.4 |
| Final Visc (CPS × 1000) | 167.0 | 131.0 | 119.4 | 116.1 | 109.8 | 62.4 | 111.4 | 40.05 | 131.0 | 86.0 |
| Pot Life (Min.) | 165 | 120 | 120 | 120 | 180 | 135 | 180 | 180 | 150 | 120 |
| Tensile to break (PSI) | 82 | 93 | 76 | 57 | 17 | 69 | 14 | 29 | 20 | 36 |
| % Elongation to break | 115 | 176 | 292 | 298 | 97.7 | 84.3 | 97.5 | 98.4 | 97.5 | 98.1 |
| Shore "00" Hardness | 77 | 87 | 90 | 92 | 85 | 93 | 88 | 90 | 90 | 86 |

Figure 2:
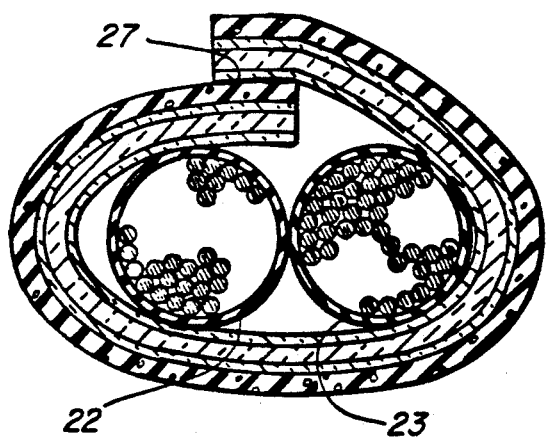
FIG. 2 is a reduced scale cross-sectional view of electrical conducting cables wrapped in the fire-block wrapper of FIG. 1 and held in place by the cured composition of this invention.

Another embodiment of this invention for the protection of electrical conducting cables is illustrated in FIGS. 1 and 2. In an industrial plant, and particularly in a nuclear power plant, it may be necessary during a fire, or other overheating, to transmit electrical energy to sense the emergency or its location, or to transmit power to equipment designed to cope with the emergency. Damage to electrical cables during a fire could

TABLE B

| | Comparative Examples | | | | | | | | Examples | | |
| --- | --- | --- | --- | --- | --- | --- | --- | --- | --- | --- | --- |
| Test | 1 | 2 | 3 | 4 | 5 | 6 | 7 | 8 | 1 | 2 | 3 |
| Flame Test | fail | fail | pass | pass | marginal | fair-poor | fair-poor | good-fair | pass | pass | excellent |
| Adhesion | v.g. | v.g. | g. | g. | pass | | | | v.g. | v.g. | excellent |
| Cure Time | | | slow | slow | pass | | | | pass | pass | pass |
| Viscosity (CPS) | | | | | | | | | 45,000 | 60,000 | 60,000 |
| Comments | | | | | | foamed, cure retarded | foamed, cure retarded | | | | |

The curable compositions of this invention may also be used to produce non-flammable products which do not operate as adhesives. They may be used, for example, to produce sheet products or molded products in a broad range of thicknesses, or shapes. Non-flammable gaskets, for example, may be prepared by pouring the composition into a gasket-shaped mold and curing it therein, or by pouring it into a flat mold, curing it to sheet form and then stamping out the gaskets.

EXAMPLES 4–13

A series of curable compositions in accordance with this invention was prepared utilizing the components shown in the following Table. The compositions were poured into flat molds about 0.075 inches thick and allowed to cure at room temperature until the cures were complete and sheets of the cured compositions were obtained. Viscosity measurements were made periodically until the initial viscosity was approximately frustrate the operation of damage control precisely when it is most needed.

FIG. 1 represents a rectangular fire block wrapper which is not drawn to scale, but rather enlarged in a thickness and foreshortened in width for clarity. Wrapper 10 is made of outer silicone foam layer 12 and next outer fiberglass cloth layer 13. The next layer 16 is a thick layer of non-woven insulating material, such as glass wool, and layer 17 is another layer of fiberglass cloth. The layers are stitched together in a quilting pattern (partially shown on the surface of layer 12) by ceramic stitching 18.

When the wrapper is ready to be wrapped around one or more electrical conducting cables, a thin layer of the curable silicone composition of this invention is applied to outer surface 24 of silicone foam layer 12 in shaded area 26, as shown in FIG. 1; and the wrapper, after placement of the cable or cables onto quilted layer 17 is wrapped around the cables and onto itself bringing one end of the surface of layer 17 into contact with area 16 on the silicone layer, as shown in FIG. 2. The wrapped assembly is held in position until room temperature curing is completed.

FIG. 2 shows a wrapped product including two electrical conducting cables 22 and 23 and cured adhesive layer 27. Elements in FIG. 2 which are identical to those of FIG. 1 bear the same identification numerals.

The curable fireblock compositions of this invention, used as an adhesive with fireblock sheets, such as those of U.S. patent application Ser. No. 103,064 may be useful in the fabrication of seats and other furnishings in aircraft and in passenger railroad cars. They may also be useful in the manufacture of switch box shields, in the jacketing of power, signal and communication cables, in rail car underbody flooring, in power rail coverings and as fire barriers in busses in the rear above the rear axle and in front of the engine compartment.

The invention has been described with reference to its preferred embodiments. It will be understood, however, by those skilled in the art that modifications may be employed without departing from the scope of the invention as defined in the claims.

What is claimed is:

1. A curable composition, suitable for use as a non-burnable, fire blocking adhesive comprising:
   a) a mixture of polysiloxane polymers comprising a straight chain component and a branched chain component, each having vinyl unsaturation
   b) a platinum catalyst,
   c) a liquid organohydrogen polysiloxane cross-linking agent,
   d) at least one low viscosity dimethylvinyl chain-stopped dimethyl polysiloxane having a viscosity below about 2000 centistokes at 25° C. in an amount from about 10 to about 200 parts by weight per 100 parts of said straight chain component, and
   e) alumina trihydrate, in an amount from about 20 to about 300 parts by wight per 100 parts of said straight chain component, wherein said straight chain component comprises a dimethylvinyl chain-stopped polysiloxane having a viscosity from about 50,000 to about 750,000 centistokes at 25° C., said branched chain component comprises trimethylsiloxane units, $SiO_2$ units and methylvinylsiloxane units, from about 2.5 to about 10 mole percent of the silicon atoms containing silicon-bonded vinyl groups and the ratio of trimethyl siloxane units of $SiO_2$ units being between 0.5:1 and 1:1, said mixture has an average molecular weight between about 50,000 and 150,000, has from about one to about five mole percent of vinyl groups and contains from about 20 to about 50 parts by weight of said branched chain component per 100 parts of said straight chain component.

2. The curable composition of claim 1 wherein said composition contains a finely divided inorganic filler selected from the groups consisting of silicon dioxide, titanium dioxide antimony oxide, calcium silicate, calcium oxide, calcium peroxide, ferric oxide, chromic oxide, cadmium sulfide, glass fibers, calcium carbonate, magnesium oxide, magnesium hydroxide alumina, carbon black, lithopone and talc and mixtures thereof in an amount up to about 200 parts by weight per 100 parts of said branched chain component.

3. The curable composition of claim 1 wherein said liquid organohydrogen polysiloxane has an average molecular weight from about 2000 to about 6000.

4. The curable composition of claim 3 wherein said liquid organohydrogen polysiloxane has an average molecular weight of about 3750.

5. The curable composition of claim 1 wherein said liquid organohydrogen polysiloxane contains dimethylhydrogen siloxane units and $SiO_2$ units.

6. The curable composition of claim 5 wherein said liquid organohydrogen polysiloxane contains an average of about 2 dimethylhydrogensiloxane units per $SiO_2$ unit.

7. The curable composition of claim 2 wherein said inorganic filler comprises a mixture of silicon dioxide and calcium carbonate and is present in an amount of about 67 weight percent based on the weight of said straight chain component.

8. The curable composition of claim 1 wherein said low viscosity dimethyl vinyl chain-stopped dimethyl polysiloxane comprises a mixture of two components, one having an average molecular weight of about 9000 and the other having an average molecular weight of about 17,500.

9. The curable composition of claim 1 wherein said mixture of polysiloxane polymers contains an organic solvent for said branched chain component in a ratio from about 2:3 to about 3:2 as compared to the amount of said branched chain component.

10. The curable composition of claim 9 wherein said solvent is selected from the group consisting of toluene and xylene.

11. The curable composition of claim 1 wherein said liquid organohydrogen polysiloxane cross-linking agent is selected from the group consisting of 1, 3, 5, 7-tetracyclo-tetrasiloxane, dimethylhydrogen chain-stopped dimethylpolysiloxane containing 2 to 3 silicon atoms in the molecule and copolymers having dimethylsiloxane units, methylhydrogen siloxane units and trimethylsiloxane units containing up to 10 silicon atoms per molecule.

12. The curable composition of claim 1 wherein said composition has a viscosity when freshly mixed between about 5,000 and about 100,000 centistokes at 25° C.

13. The cured composition of claim 1.

* * * * *